United States Patent
Luo et al.

(10) Patent No.: US 10,921,944 B2
(45) Date of Patent: Feb. 16, 2021

(54) TOUCH PANEL, METHOD FOR MANUFACTURING THE SAME AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Hongqiang Luo, Beijing (CN); Qing Gong, Beijing (CN); Jianjun Wu, Beijing (CN); Chang Zhang, Beijing (CN); Biyu Zhao, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/395,146

(22) Filed: Apr. 25, 2019

(65) Prior Publication Data

US 2020/0019282 A1 Jan. 16, 2020

(30) Foreign Application Priority Data

Jul. 13, 2018 (CN) .......................... 201810771090.2

(51) Int. Cl.
*G06F 3/044* (2006.01)
*G06F 3/041* (2006.01)

(52) U.S. Cl.
CPC .......... *G06F 3/0448* (2019.05); *G06F 3/0446* (2019.05); *G06F 3/04164* (2019.05); *G06F 2203/04103* (2013.01)

(58) Field of Classification Search
CPC .. G06F 3/0448; G06F 3/0446; G06F 3/04164; G06F 2203/04103; G06F 2203/04111; G06F 3/044
See application file for complete search history.

(56) References Cited

U.S. PATENT DOCUMENTS

| | | | | |
|---|---|---|---|---|
| 8,982,085 B2* | 3/2015 | Shih | ........................ | G06F 3/041 345/173 |
| 9,176,635 B2* | 11/2015 | Jun | ......................... | G06F 3/044 |
| 9,335,879 B2* | 5/2016 | Kubo | ....................... | G06F 3/044 |
| 9,477,363 B2* | 10/2016 | Lien | .......................... | G06F 3/044 |
| 9,519,382 B2* | 12/2016 | Takashima | ............ | G06F 3/0446 |

(Continued)

FOREIGN PATENT DOCUMENTS

CN 104216543 A 12/2014

*Primary Examiner* — Michael J Jansen, II
(74) *Attorney, Agent, or Firm* — Kinney & Lange, P.A.

(57) ABSTRACT

A touch panel, a method for manufacturing the same and a display device are disclosed. The touch panel includes: a substrate including a plane portion and at least one bending portion extending from an edge of the plane portion and bent to form a side of the plane portion; a plane touch module arranged at the plane portion and configured to sense a plane touch signal generated at the plane portion; and a side touch module arranged at the bending portion and configured to sense a side touch signal generated at the bending portion. A part of touch signal lines of the plane touch module are multiplexed as touch signal lines of the side touch module.

12 Claims, 3 Drawing Sheets

(56) References Cited

U.S. PATENT DOCUMENTS

| | | | |
|---|---|---|---|
| 9,798,399 B2* | 10/2017 | Vandermeijden | G06F 3/041 |
| 10,078,406 B2* | 9/2018 | Tanemura | G06F 3/0418 |
| 10,180,761 B2* | 1/2019 | Watanabe | G06F 3/044 |
| 10,539,979 B2* | 1/2020 | Ha | G06F 1/1643 |
| 10,761,649 B2* | 9/2020 | Chan | G06F 3/0412 |
| 2013/0181938 A1* | 7/2013 | Takashima | G06F 3/044 345/174 |
| 2014/0354902 A1 | 12/2014 | Shih et al. | |
| 2015/0109243 A1* | 4/2015 | Jun | G06F 3/044 345/174 |
| 2015/0234502 A1* | 8/2015 | Kubo | G06F 3/044 345/174 |
| 2015/0346850 A1* | 12/2015 | Vandermeijden | G06F 3/044 345/173 |
| 2016/0054828 A1* | 2/2016 | Lien | G06F 3/044 345/174 |
| 2017/0131811 A1* | 5/2017 | Watanabe | G06F 1/1643 |
| 2017/0285794 A1* | 10/2017 | Tanemura | G06F 3/044 |
| 2019/0041912 A1* | 2/2019 | Ha | G06F 3/03545 |
| 2019/0265832 A1* | 8/2019 | Chan | G06F 3/0416 |
| 2020/0019282 A1* | 1/2020 | Luo | G06F 3/04164 |

\* cited by examiner

TOUCH PANEL, METHOD FOR MANUFACTURING THE SAME AND DISPLAY DEVICE

CROSS-REFERENCE TO RELATED APPLICATION

The present application claims a priority of the Chinese patent application No. 201810771090.2 filed on Jul. 13, 2018, which is incorporated herein by reference in its entirety.

TECHNICAL FIELD

The present disclosure relates to the field of display technology, in particular to a touch panel, a method for manufacturing the same and a display device.

BACKGROUND

Depending on a sensing principle, a conventional touch panel is of a resistive or capacitive type. Due to a relatively high penetration level, a market share of the capacitive touch panels has exceeded that of the resistive touch panel in smart phones.

Usually, touch electrodes of the conventional touch panel are merely located at a same plane, so it is difficult to perform a touch operation at a side surface of the touch panel.

SUMMARY

In one aspect, the present disclosure provides in some embodiments a touch panel, including: a substrate including a plane portion and at least one bending portion extending from an edge of the plane portion and bent to form a side of the plane portion; a plane touch module arranged at the plane portion and configured to sense a plane touch signal generated at the plane portion; and a side touch module arranged at the bending portion and configured to sense a side touch signal generated at the bending portion. A part of touch signal lines of the plane touch module are multiplexed as touch signal lines of the side touch module.

In a possible embodiment of the present disclosure, the plane portion is provided with two edges arranged opposite to each other, and the touch panel includes two bending portions arranged at the two edges respectively.

In a possible embodiment of the present disclosure, the side touch module includes a plurality of groups of touch electrodes, and each group of touch electrodes include a first sensing electrode and a first driving electrode.

In a possible embodiment of the present disclosure, the first sensing electrode and the first driving electrode in each group of touch electrodes are rotationally symmetric with each other about a center point of the group of touch electrodes.

In a possible embodiment of the present disclosure, one of the first sensing electrode and the first driving electrode is of an L or L-inverted shape.

In a possible embodiment of the present disclosure, the first sensing electrode and the first driving electrode in each group of touch electrodes are symmetric with each other about a central axis of the group of touch electrodes.

In a possible embodiment of the present disclosure, each of the first sensing electrode and the first driving electrode is of a rectangular shape.

In a possible embodiment of the present disclosure, the touch signal lines include sensing signal lines and driving signal lines. The plane touch module includes second sensing electrodes arranged in a first direction and each connected to the corresponding sensing signal line, and second driving electrodes arranged in a second direction and each connected to the corresponding driving signal line. Each first sensing electrode is electrically connected to the second sensing electrode closest to the first sensing electrode or connected to a sensing signal line for the corresponding second sensing electrode. Each first driving electrode is electrically connected to the second driving electrode closest to the first driving electrode, and the first direction is angled relative to the second direction.

In a possible embodiment of the present disclosure, each first sensing electrode is formed integrally with, or connected via a conductive connection line to, the second sensing electrode closest to the first sensing electrode.

In a possible embodiment of the present disclosure, each first driving electrode is formed integrally with, or connected via a conductive connection line to, the second driving electrode closest to the first driving electrode.

In a possible embodiment of the present disclosure, each first sensing electrode is formed integrally with the second sensing electrode closest to the first sensing electrode, and each first driving electrode is formed integrally with the second driving electrode closest to the first driving electrode.

In another aspect, the present disclosure provides in some embodiments a method for manufacturing a touch panel, including: providing a substrate including a plane portion and at least one bending portion extending from an edge of the plane portion and bent to form a side of the plane portion; forming a plane touch module at the plane portion, the plane touch module being configured to sense a plane touch signal generated at the plane portion; and forming a side touch module at the bending portion, the side touch module being configured to sense a side touch signal generated at the bending portion. A part of touch signal lines of the plane touch module are multiplexed as touch signal lines of the side touch module.

In a possible embodiment of the present disclosure, the forming the side touch module includes forming a plurality of groups of touch electrodes, and each group of touch electrodes include a first sensing electrode and a first driving electrode.

In a possible embodiment of the present disclosure, the touch signal lines include sensing signal lines and driving signal lines. The forming the plane touch module includes: forming second sensing electrodes arranged in a first direction and each connected to the corresponding sensing signal line; and forming second driving electrodes arranged in a second direction and each connected to the corresponding driving signal line, wherein the first sensing electrode is electrically connected to the second sensing electrode closest to the first sensing electrode or a sensing signal line for the corresponding second sensing electrode of the plane touch module, wherein the first driving electrode is electrically connected to the second driving electrode closest to the first driving electrode, and the first direction is angled relative to the second direction.

In a possible embodiment of the present disclosure, the forming the first sensing electrode and the first driving electrode includes forming the first sensing electrode and the first driving electrode in each group of touch electrodes in such a manner as to be rotationally symmetric with each other about a center point of the group of touch electrodes.

In a possible embodiment of the present disclosure, the forming the first sensing electrode and the first driving electrode includes forming the first sensing electrode and the first driving electrode in each group of touch electrodes in such a manner as to be symmetric with each other about a central axis of the group of touch electrodes.

In yet another aspect, the present disclosure provides in some embodiments a display device including a display panel and the above-mentioned touch panel.

In a possible embodiment of the present disclosure, the display device is a mobile terminal, and the side touch module corresponds to at least one button.

In a possible embodiment of the present disclosure, the side touch module includes a plurality of groups of touch electrodes, and at least one group of touch electrodes corresponds to one button.

DETAILED DESCRIPTION

In order to make the objects, the technical solutions and the advantages of the present disclosure more apparent, the present disclosure will be described hereinafter in a clear and complete manner in conjunction with the drawings and embodiments.

In a conventional design of a touch panel, touch electrodes and metal lines connected to the touch electrodes are added at a bending portion of a display substrate. In this scheme, a side touch region is formed in a self-capacitive manner, so it is merely able to simply determine whether a touch signal is generated at the side touch region, but it is impossible to accurately determine coordinates of a touch point. In addition, due to the additional metal lines connected to the touch electrodes, a bezel width of the touch panel is increased.

An object of the present disclosure is to provide a touch panel, a method for manufacturing the same and a display device, so as to achieve a touch function at different planes, and ensure the touch accuracy without increasing the bezel width of the touch panel.

The present disclosure provides in some embodiments a touch panel, which includes: a substrate including a plane portion and at least one bending portion extending from an edge of the plane portion and bent to form a side of the plane portion; a plane touch module arranged at the plane portion and configured to sense a plane touch signal generated at the plane portion; and a side touch module arranged at the bending portion and configured to sense a side touch signal generated at the bending portion. A part of touch signal lines of the plane touch module are multiplexed as touch signal lines of the side touch module.

According to the embodiments of the present disclosure, the touch panel includes the plane touch module arranged at the plane portion and the side touch module arranged at the bending portion, the plane touch module is capable of sensing the plane touch signal generated at the plane portion, and the side touch module is capable of sensing the side touch signal generated at the bending portion. As a result, it is able to achieve a touch function at different planes. In addition, a part of the touch signal lines of the plane touch module are multiplexed as the touch signal lines of the side touch module, so it is unnecessary to provide additional peripheral lines for the side touch module, and thereby it is unnecessary to increase the bezel width of the touch panel.

The substrate may include a base substrate and a driving circuit layer arranged on the base substrate and including, but not limited to, gate lines, data lines, driving thin film transistors and switching thin film transistors.

Figure 1:
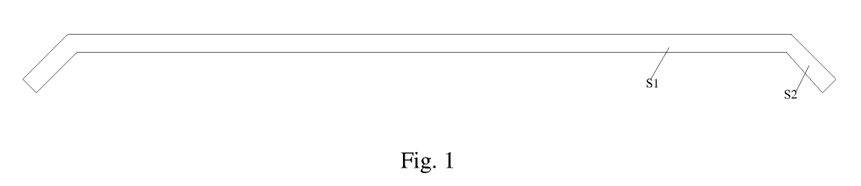
FIG. 1 is a sectional view of a touch panel according to one embodiment of the present disclosure.

In a possible embodiment of the present disclosure, as shown in FIG. 1, the plane portion S1 may be provided with two edges arranged opposite to each other, and the touch panel may include two bending portions S2 arranged at the two opposite edges respectively. In this way, it is able to achieve the touch function at the two bending portions arranged at the two opposite edges.

Of course, an arrangement mode of the plane portion and the bending portions may not be limited to that shown in FIG. 1, and the number of the bending portions may also be one, three or four. When there is merely one bending portion, the bending portion may be arranged at any edge of the plane portion so as to achieve a side touch function. When there are three bending portions, these bending portions may be arranged at any three edges of the plane portion respectively, so as to achieve the side touch function. When there are four bending portions, these bending portions may be arranged at the four edges of the plane portion respectively, so as to achieve the side touch function.

Further, the side touch module may include a plurality of groups of touch electrodes, and each group of touch electrodes may include a first sensing electrode and a first driving electrode. In this way, the side touch module may detect a touch operation in a mutually-capacitive mode, and as compared with the self-capacitive mode, it is able to accurately determine the coordinates of the touch point, thereby to accurately detect the touch operation.

In the mutually-capacitive detection mode, the touch electrodes include sensing electrodes and driving electrodes crossing to each other. The touch position is determined through detecting a mutual capacitance at a crossing point. To be specific, when the touch operation is made by a finger, the mutual capacitance at the corresponding position may decrease. In the embodiments of the present disclosure, the plane touch module may include a plurality of groups of touch electrodes, and each group of touch electrodes may include a second driving electrode and a second sensing electrode. The side touch module may include a plurality of groups of touch electrodes, and each group of touch electrodes may include a first sensing electrode and a first driving electrode. Data about a touch capacitance generated by each group of touch electrodes of the plane touch module and data about a touch capacitance generated by each group of touch electrodes of the side touch module may be stored in a touch detection circuit. When the touch operation is made by the finger, the data about the touch capacitances generated by several groups of touch electrodes in proximity to the touch position may change, and a maximum change may occur for the data about the touch capacitance generated by the group of touch electrodes at a center of the touch position. The touch detection circuit may analyze the changes in the data about the touch capacitances so as to determine the touch position. When the bending portion is touched by the finger, the group of touch electrodes with the maximum change in the data about the touch capacitance may be located at the bending portion rather than the plane portion, it is able to determine that the touch operation is made at the bending portion. In this way, even when the touch signal lines of the side touch module are multiplexed as the touch signal lines of the plane touch module, it is still able to determine the touch position in accordance with the change in the data about the touch capacitance.

For each group of touch electrodes of the side touch module, the first sensing electrode may cross, or may be arranged parallel to, the first driving electrode. In the embodiments of the present disclosure, shapes of the first sensing electrode and the first driving electrode as well as an arrangement mode thereof will not be particularly defined, as long as a capacitance generated between the first sensing electrode and the first driving electrode may change when the touch operation is made.

In a possible embodiment of the present disclosure, the first sensing electrode and the first driving electrode in each group of touch electrodes may be rotationally symmetric with each other about a center of the group of touch electrodes, and one of the first sensing electrode and the first driving electrode may be of an L or L-inverted shape.

In another possible embodiment of the present disclosure, the first sensing electrode and the first driving electrode in each group of touch electrodes may be symmetric with each other about a central axis of the group of touch electrodes, and each of the first sensing electrode and the first driving electrode may be of a rectangular shape.

Further, the touch signal lines may include sensing signal lines and driving signal lines. The plane touch module may include second sensing electrodes arranged in a first direction and each connected to the corresponding sensing signal line. Each first sensing electrode of the side touch module may be connected to a sensing signal line for the corresponding second sensing electrode of the plane touch module or electrically connected to the second sensing electrode closest to the first sensing electrode. The plane touch module may further include second driving electrodes arranged in a second direction and each connected to the corresponding driving signal line. Each first driving electrode may be electrically connected to the second driving electrode closest to the first driving electrode, and the first direction may be angled relative to the second direction at an angle, e.g., within the range from 70° to 90°.

In a possible embodiment of the present disclosure, the first direction may be a row direction. The touch signal lines may include sensing signal lines and driving signal lines. The second sensing electrodes may be arranged at the plane portion in rows, and the second sensing electrodes in each row may be connected to one sensing signal line. Each first sensing electrode at the bending portion may be connected to a sensing signal line for the second sensing electrodes in a corresponding row on the plane portion, or electrically connected to the second sensing electrode closest to the first sensing electrode. In this way, a signal generated by sensing electrodes on the bending portion may be transmitted via the corresponding sensing signal line at the plane portion without any additional peripheral line, so it is unnecessary to increase the bezel width of the touch panel.

The second driving electrodes may be arranged at the plane portion in columns, and the second driving electrodes in each column may be connected to one driving signal line. Each first driving electrode at the bending portion may be electrically connected to the second driving electrode closest to the first driving electrode. In this way, a signal generated by driving electrodes at the bending portion may be transmitted via the corresponding driving signal line at the plane portion without any additional peripheral line, so it is unnecessary to increase the bezel width of the touch panel.

In another possible embodiment of the present disclosure, the first direction may be a column direction. The touch signal lines may include sensing signal lines and driving signal lines. The second driving electrodes may be arranged at the plane portion in rows, and the second driving electrodes in each row may be connected to one driving signal line. Each first driving electrode at the bending portion may be connected to a driving signal line for the corresponding second driving electrode at the plane portion, or electrically connected to the second driving electrode closest to the first driving electrode. In this way, a signal generated by driving electrodes at the bending portion may be transmitted via the corresponding driving signal line at the plane portion without any additional peripheral line, so it is unnecessary to increase the bezel width of the touch panel.

The second sensing electrodes may be arranged at the plane portion in columns, and the second sensing electrodes in each column may be connected to one sensing signal line. Each first sensing electrode at the bending portion may be electrically connected to the second sensing electrode closest to the first sensing electrode. In this way, a signal generated by sensing electrodes may be transmitted via the corresponding sensing signal line at the plane portion without any additional peripheral line, so it is unnecessary to increase the bezel width of the touch panel.

When each first sensing electrode at the bending portion is electrically connected to the second sensing electrode closest to the first sensing electrode, the first sensing electrode at the bending portion may be connected via a conductive connection line to, or formed integrally with, the second sensing electrode closest to the first sensing electrode.

When each first driving electrode at the bending portion is electrically connected to the second driving electrode closest to the first driving electrode, the first driving electrode at the bending portion may be connected via a conductive connection line or, or formed integrally with, the second driving electrode closest to the first driving electrode.

Figure 2:
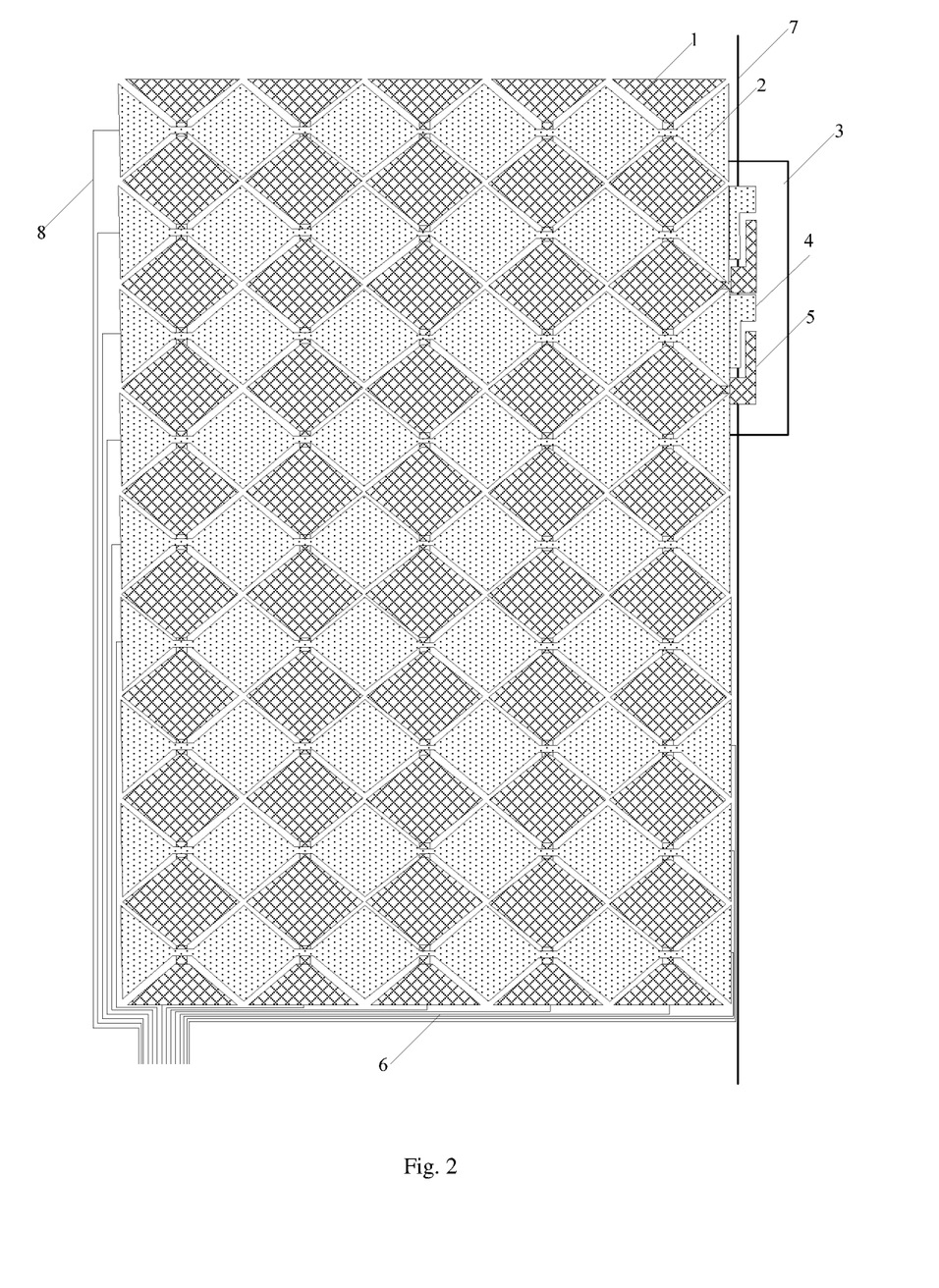
FIG. 2 is a planar view of the touch panel according to one embodiment of the present disclosure.

In a possible embodiment of the present disclosure, as shown in FIG. 2, a side touch region 3 may be arranged at a right edge of the plane portion, and the numeral "7" represents a bending line. The plurality of groups of touch electrodes may be arranged at the side touch region 3, and each group of touch electrodes may include a first sensing electrode 4 and a first driving electrode 5. The first sensing electrode 4 and the first driving electrode 5 may be rotationally symmetric with each other about a center of the group of touch electrodes. The first driving electrode 5 may be of an L-inverted shape.

Second sensing electrodes 2 may be arranged at the plane portion in rows, and second driving electrodes 1 may be arranged at the plane portion in columns. Each second sensing electrode 2 may cross, and may be insulated from, the corresponding second driving electrode 1. In addition, sensing signal lines 8 and driving signal lines 6 may be arranged at the plane portion, the second sensing electrodes 2 in each row may be connected to one sensing signal line 8, and the second driving electrodes 1 in each column may be connected to one driving signal line 6. In order to reduce the bezel width, no additional sensing signal lines 8 and driving signal lines 6 may be arranged at the side touch region 3. Each first driving electrode 5 at the side touch region 3 may be connected to the second driving electrode 1 closest to the first driving electrode 5, and each first sensing electrode 4 at the side touch region 3 may be connected to the second sensing electrode 2 closest to the first sensing electrode 4. In this way, it is able to transmit a signal generated by each first driving electrode 5 at the side touch region 3 via the corresponding driving signal line at the plane portion and transmit a signal generated by each first sensing electrode 4 at the side touch region 3 via the corresponding sensing signal line at the plane portion, i.e., it is unnecessary to provide any additional peripheral lines, so it is unnecessary to increase the bezel width of the touch panel.

To be specific, each first sensing electrode 4 at the side touch region 3 may be formed integrally with the second sensing electrode 2 closest to the first sensing electrode 4, and each first driving electrode 5 at the side touch region 3 may be formed integrally with the second driving electrode 1 closest to the first driving electrode 5.

Figure 3:
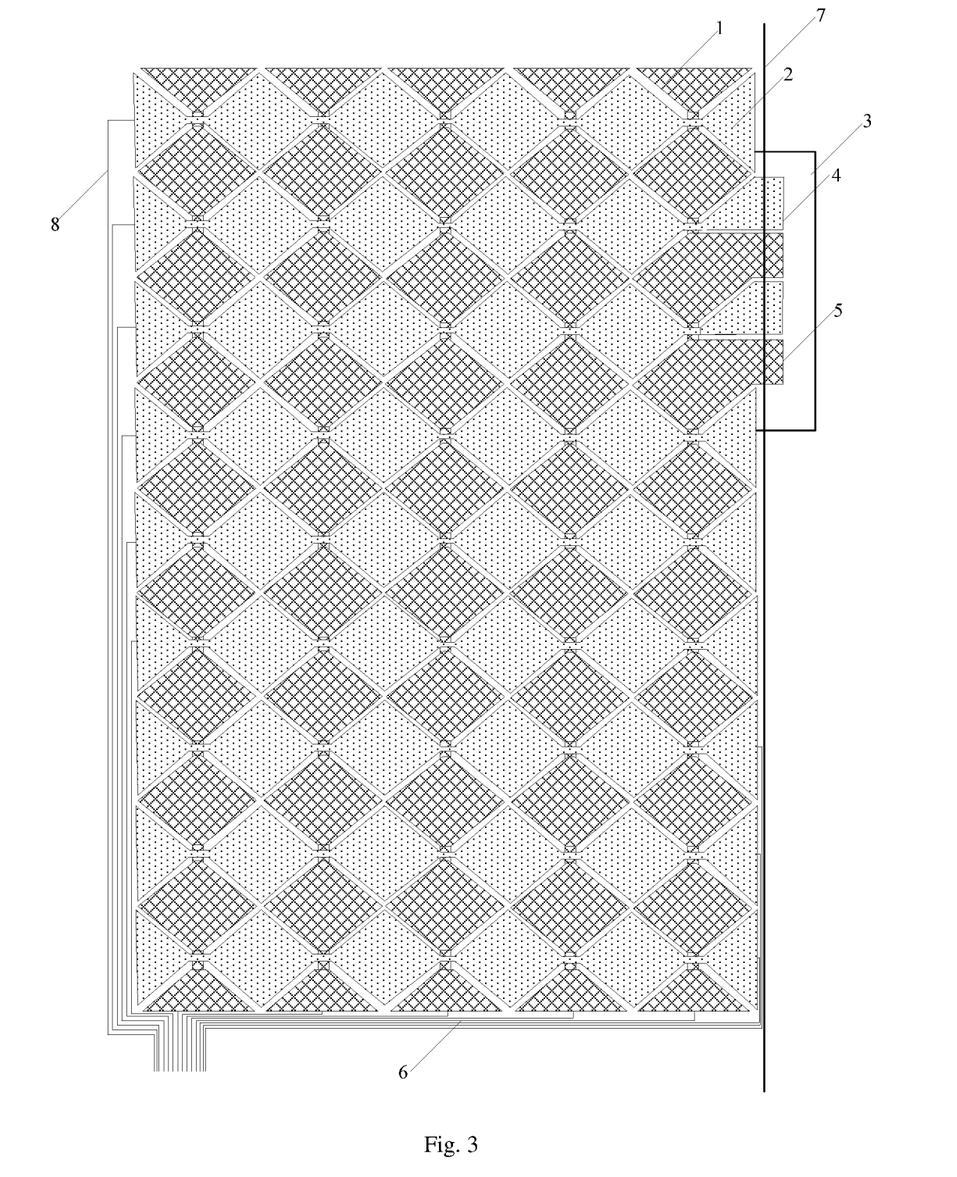
FIG. 3 is another planar view of the touch panel according to one embodiment of the present disclosure.

In another possible embodiment of the present disclosure, as shown in FIG. 3, the side touch region 3 may be arranged at a side edge of the plane portion, and the numeral "7" represents a bending line. The plurality of groups of touch electrodes may be arranged at the side touch region 3, and each group of touch electrodes may include the first sensing electrode 4 and the first driving electrode 5. The first sensing electrode 4 and the first driving electrode 5 in each group of touch electrodes may be symmetric with each other about a central axis of the group of touch electrodes, and the first driving electrode 5 may be of a rectangular shape.

The second sensing electrodes 2 may be arranged at the plane portion in rows, and second driving electrodes 1 may be arranged at the plane portion in columns. Each second sensing electrode 2 may cross, and may be insulated from, the corresponding second driving electrode 1. In addition, the sensing signal lines 8 and the driving signal lines 6 may be arranged at the plane portion, the second sensing electrodes 2 in each row may be connected to one sensing signal line 8, and the second driving electrodes 1 in each column may be connected to one driving signal line 6. In order to reduce the bezel width, no additional sensing signal lines 8 and driving signal lines 6 may be arranged at the side touch region 3. Each first driving electrode 5 at the side touch region 3 may be connected to the second driving electrode 1 closest to the first driving electrode 5, and each first sensing electrode 4 at the side touch region 3 may be connected to the second sensing electrode 2 closest to the first sensing electrode 4. In this way, it is able to transmit a signal generated by each first driving electrode 5 at the side touch region 3 via the corresponding driving signal line at the plane portion and transmit a signal generated by each first sensing electrode 4 at the side touch region 3 via the corresponding sensing signal line at the plane portion, i.e., it is unnecessary to provide any additional peripheral lines, so it is unnecessary to increase the bezel width of the touch panel.

To be specific, each first sensing electrode 4 at the side touch region 3 may be formed integrally with the second sensing electrode 2 closest to the first sensing electrode 4, and each first driving electrode 5 at the side touch region 3 may be formed integrally with the second driving electrode 1 closest to the first driving electrode 5.

The present disclosure further provides in some embodiments a method of manufacturing a touch panel, which includes: providing a substrate including a plane portion and at least one bending portion extending from an edge of the plane portion and bent to form a side of the plane portion; forming a plane touch module at the plane portion, the plane touch module being configured to sense a plane touch signal generated at the plane portion; and forming a side touch module at the bending portion, the side touch module being configured to sense a side touch signal generated at the bending portion. A part of touch signal lines of the plane touch module are multiplexed as touch signal lines of the side touch module.

According to the embodiments of the present disclosure, the touch panel includes the plane touch module arranged at the plane portion and the side touch module arranged at the bending portion, the plane touch module is capable of sensing the plane touch signal generated at the plane portion, and the side touch module is capable of sensing the side touch signal generated at the bending portion. As a result, it is able to achieve a touch function at different planes. In addition, a part of the touch signal lines of the plane touch module are multiplexed as the touch signal lines of the side touch module, so it is unnecessary to provide additional peripheral lines for the side touch module, and thereby it is unnecessary to increase the bezel width of the touch panel.

In a possible embodiment of the present disclosure, as shown in FIG. 1, the plane portion S1 may be provided with two edges arranged opposite to each other, and the touch panel may include two bending portions S2 arranged at the two edges respectively. In this way, it is able to achieve the touch function through the two bending portions at the two edges arranged opposite to each other.

Of course, an arrangement mode of the plane portion and the bending portions may not be limited to that shown in FIG. 1, and the number of the bending portions may also be one, three or four. When there is merely one bending portion, the bending portion may be arranged at any edge of the plane portion so as to achieve a side touch function. When there are three bending portions, these bending portions may be arranged at any three edges of the plane portion respectively, so as to achieve the side touch function. When there are four bending portions, these bending portions may be arranged at the four edges of the plane portion respectively, so as to achieve the side touch function.

Further, the forming the side touch module may include forming a plurality of groups of touch electrodes, and each group of touch electrodes may include a first sensing electrode and a first driving electrode. In this way, the side touch module may detect a touch operation in a mutually-capacitive mode, and as compared with the self-capacitive mode, it is able to accurately determine the coordinates of the touch point, thereby to accurately detect the touch operation.

For each group of touch electrodes of the side touch module, the first sensing electrode may cross, or may be arranged parallel to, the first driving electrode. In the embodiments of the present disclosure, shapes of the first sensing electrode and the first driving electrode as well as an arrangement mode thereof will not be particularly defined, as long as a capacitance generated between the first sensing electrode and the first driving electrode may change when the touch operation is made.

In a possible embodiment of the present disclosure, the first sensing electrode and the first driving electrode in each group of touch electrodes may be rotationally symmetric with each other about a center point of the group of touch electrodes. The forming the first sensing electrode and the first driving electrode may include forming the first sensing electrode and the first driving electrode in each group of touch electrodes in such a manner as to be rotationally symmetric with each other about the center point of the group of touch electrodes.

In another possible embodiment of the present disclosure, the first sensing electrode and the first driving electrode in each group of touch electrodes may be symmetric with each other about a central axis of the group of touch electrodes.

The forming the first sensing electrode and the first driving electrode may include forming the first sensing electrode and the first driving electrode in each group of touch electrodes in such a manner as to be symmetric with each other about the central axis of the group of touch electrodes.

In a possible embodiment of the present disclosure, the touch signal lines may include sensing signal lines and driving signal lines. The forming the plane touch module may include: forming second sensing electrodes arranged in a first direction and each connected to the corresponding sensing signal line, each first sensing electrode being electrically connected to the second sensing electrode closest to the first sensing electrode or a sensing signal line for the corresponding second sensing electrode; and forming second driving electrodes arranged in a second direction and each connected to the corresponding driving signal line. Each first driving electrode may be electrically connected to the second driving electrode closest to the first driving electrode, and the first direction may be angled relative to the second direction at an angle, e.g., within the range from 70° to 90°.

In a possible embodiment of the present disclosure, the first direction may be a row direction. The second sensing electrodes may be formed at the plane portion in rows, and the second sensing electrodes in each row may be connected to one sensing signal line. Each first sensing electrode at the bending portion may be connected to a sensing signal line for the second sensing electrodes in a corresponding row of the plane portion, or electrically connected to the second sensing electrode closest to the first sensing electrode. In this way, a signal generated by sensing electrode may be transmitted via the corresponding sensing signal line at the plane portion without any additional peripheral line, so it is unnecessary to increase the bezel width of the touch panel.

The second driving electrodes may be formed at the plane portion in columns, and the second driving electrodes in each column may be connected to one driving signal line. Each first driving electrode at the bending portion may be electrically connected to the second driving electrode closest to the first driving electrode. In this way, a signal generated by driving electrode at the bending portion may be transmitted via the corresponding driving signal at the plane portion without any additional peripheral line, so it is unnecessary to increase the bezel width of the touch panel.

In another possible embodiment of the present disclosure, the first direction may be a column direction. The touch signal lines may include sensing signal lines and driving signal lines. The forming the plane touch module includes: forming the second driving electrodes at the plane portion in rows, and the second driving electrodes in each row being connected to one driving signal line, each first driving electrode at the bending portion being connected to a driving signal line for the corresponding second driving electrode at the plane portion, or each first driving electrode at the bending portion being electrically connected to the second driving electrode closest to the first driving electrode. In this way, a signal generated by each first driving electrode at the bending portion may be transmitted via the corresponding driving signal line at the plane portion without any additional peripheral line, so it is unnecessary to increase the bezel width of the touch panel.

The second sensing electrodes may be formed at the plane portion in columns, and the second sensing electrodes in each column may be connected to one sensing signal line. Each first sensing electrode at the bending portion may be electrically connected to the second sensing electrode closest to the first sensing electrode. In this way, a signal generated by each first sensing electrode at the bending portion may be transmitted via the corresponding sensing signal line at the plane portion without any additional peripheral line, so it is unnecessary to increase the bezel width of the touch panel.

The present disclosure further provides in some embodiments a display device, which includes a display panel and the above-mentioned touch panel. The display device may be any product or member having a display function, e.g., television, display, digital photo frame, mobile phone, flat-panel computer or navigator. In addition, the display device may further include a flexible circuit board, a printed circuit board and a back plate.

In a possible embodiment of the present disclosure, the display device may be a mobile terminal, and the side touch module may correspond to at least one button. In this way, it is able to achieve such functions as volume control and startup&shutdown through the side touch module, without any necessity to provide any physical buttons at a side of the mobile terminal.

In a possible embodiment of the present disclosure, the side touch module may include a plurality of groups of touch electrodes, and at least one group of touch electrodes may correspond to one button. In this way, when the touch electrodes corresponding to a button are being touched, it is able for the display device to achieve the function corresponding to the button.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A touch panel, comprising:
   a substrate comprising a plane portion and at least one bending portion, the at least one bending portion extending from an edge of the plane portion and bent to form a side of the plane portion;
   a plane touch module arranged at the plane portion and configured to sense a plane touch signal generated at the plane portion; and a side touch module arranged at the at least one bending portion and configured to sense a side touch signal generated at the at least one bending portion, wherein a part of touch signal lines of the plane touch module are multiplexed as touch signal lines of the side touch module;

wherein the side touch module comprises a plurality of groups of touch electrodes, and each group of touch electrodes comprise a first sensing electrode and a first driving electrode;

wherein the touch signal lines comprise sensing signal lines and driving signal lines;

wherein the plane touch module comprises second sensing electrodes arranged in a first direction and each connected to a corresponding sensing signal line, and second driving electrodes arranged in a second direction and each connected to a corresponding driving signal line;

wherein the first sensing electrode is electrically connected to the second sensing electrode closest to the first sensing electrode or electrically connected to a sensing signal line for a corresponding second sensing electrode of the plan touch module;

wherein the first driving electrode is electrically connected to the second driving electrode closest to the first driving electrode, and the first direction is angled relative to the second direction; and wherein the first sensing electrode is formed integrally with the second sensing electrode closest to the first sensing electrode, and the first driving electrode is formed integrally with the second driving electrode closest to the first driving electrode.

2. The touch panel according to claim 1, wherein the first sensing electrode and the first driving electrode in each group of touch electrodes are rotationally symmetric with each other about a center point of the group of touch electrodes.

3. The touch panel according to claim 2, wherein one of the first sensing electrode and the first driving electrode is of an L or L-inverted shape.

4. The touch panel according to claim 1, wherein the first sensing electrode and the first driving electrode in each group of touch electrodes are symmetric with each other about a central axis of the group of touch electrodes.

5. The touch panel according to claim 4, wherein each of the first sensing electrode and the first driving electrode is of a rectangular shape.

6. The touch panel according to claim 1, wherein the plane portion is provided with two edges arranged opposite to each other, and the touch panel comprises two bending portions arranged at the two edges respectively.

7. A display device, comprising a display panel and the touch panel according to claim 1.

8. A method for manufacturing a touch panel, comprising:
providing a substrate comprising a plane portion and at least one bending portion extending from an edge of the plane portion and bent to form a side of the plane portion;

forming a plane touch module at the plane portion, the plane touch module being configured to sense a plane touch signal generated at the plane portion; and forming a side touch module at the bending portion, the side touch module being configured to sense a side touch signal generated at the bending portion, wherein a part of touch signal lines of the plane touch module are multiplexed as touch signal lines of the side touch module;

wherein the side touch module comprises a plurality of groups of touch electrodes, and each group of touch electrodes comprise a first sensing electrode and a first driving electrode;

wherein the touch signal lines comprise sensing signal lines and driving signal lines;

wherein the forming the plane touch module comprises:
forming second sensing electrodes arranged in a first direction and each connected to a corresponding sensing signal line; and forming second driving electrodes arranged in a second direction and each connected to a corresponding driving signal line;

wherein the first sensing electrode is electrically connected to the second sensing electrode closest to the first sensing electrode or a sensing signal line for a corresponding second sensing electrode of the plane touch module;

wherein the first driving electrode is electrically connected to the second driving electrode closest to the first driving electrode, and the first direction is angled relative to the second direction; and wherein the first sensing electrode is formed integrally with the second sensing electrode closest to the first sensing electrode, and the first driving electrode is formed integrally with the second driving electrode closest to the first driving electrode.

9. The method according to claim 8, wherein forming the first sensing electrode and the first driving electrode comprises forming the first sensing electrode and the first driving electrode in each group of touch electrodes in such a manner as to be rotationally symmetric with each other about a center point of the group of touch electrodes.

10. The method according to claim 8, wherein forming the first sensing electrode and the first driving electrode comprises forming the first sensing electrode and the first driving electrode in each group of touch electrodes in such a manner as to be symmetric with each other about a central axis of the group of touch electrodes.

11. The display device according to claim 7, wherein the display device is a mobile terminal, and the side touch module corresponds to at least one button.

12. The display device according to claim 11, wherein the side touch module comprises a plurality of groups of touch electrodes, and at least one group of touch electrodes corresponds to one button.

* * * * *